United States Patent
Khorasani

(10) Patent No.: US 9,855,894 B1
(45) Date of Patent: Jan. 2, 2018

(54) APPARATUS, SYSTEM AND METHODS FOR PROVIDING REAL-TIME SENSOR FEEDBACK AND GRAPHICALLY TRANSLATING SENSOR CONFIDENCE DATA

(71) Applicants: VOLKSWAGEN AKTIENGESELLSCHAFT, Wolfsburg (DE); AUDI AG, Ingolstadt (DE); Dr. Ing. h.c. F. Porsche AG, Stuttgart (DE)

(72) Inventor: Allen Khorasani, San Mateo, CA (US)

(73) Assignees: Volkswagen Aktiengesellschaft, Wolfsburg (DE); Audi AG, Ingoldstadt (DE); Dr. Ing. H.C. F. Porsche AG, Stuttgart (DE)

(*) Notice: Subject to any disclaimer, the term of this patent is extended or adjusted under 35 U.S.C. 154(b) by 0 days.

(21) Appl. No.: 15/268,402

(22) Filed: Sep. 16, 2016

(51) Int. Cl.
*B60Q 1/00* (2006.01)
*B60R 1/00* (2006.01)
(Continued)

(52) U.S. Cl.
CPC .............. *B60R 1/00* (2013.01); *B60K 35/00* (2013.01); *G06K 9/00798* (2013.01); *G06K 9/00805* (2013.01); *G06T 11/001* (2013.01); *G06T 11/60* (2013.01); *G06T 15/08* (2013.01); *B60K 2350/106* (2013.01);
(Continued)

(58) Field of Classification Search
CPC .............. B60R 1/00; B60R 2300/105; B60R 2300/8093; B60R 11/04; B60R 2300/205; B60R 2300/102; B60K 35/00; B60K 2350/1076; B60K 2350/1084; B60K 2350/2069; B60K 2350/2008; B60K 2350/20; B60K 2350/2065; G06T 11/60; G06K 9/00798; G06K 9/00805; G06K 9/4647; B60T 2201/024; B60T 7/12; B60T 7/22; B60W 2050/146; B60W 50/0097
See application file for complete search history.

(56) References Cited

U.S. PATENT DOCUMENTS 9,489,635 B1\* 11/2016 Zhu ...................... G06N 99/005
2009/0204289 A1\* 8/2009 Lehre .................... B60W 30/16
701/36
(Continued)

*Primary Examiner* — Thomas McCormack
(74) *Attorney, Agent, or Firm* — Loza & Loza, LLP; Peter Zura

(57) ABSTRACT

A system, apparatus and method for processing sensor data in a vehicle, where one or more sensors are configured to provide sensor data relating to at least one of a vehicle operating characteristic and/or a driving environment. A processing apparatus is configured to receive data from the one or more sensors. A display is configured to display a scene comprising one or more images associated with the sensor data, wherein the processing apparatus includes a probability processing module configured to process the sensor data to calculate a sensor confidence value representing an estimated accuracy for at least one of the one or more sensors, and wherein the processing apparatus includes a graphics processing module configured to process the sensor confidence value to modify the scene on the display to represent the estimated accuracy for the at least one or more of the sensors.

17 Claims, 8 Drawing Sheets

(51) Int. Cl.
*B60K 35/00* (2006.01)
*G06K 9/00* (2006.01)
*G06T 15/08* (2011.01)
*G06T 11/60* (2006.01)
*G06T 11/00* (2006.01)

(52) U.S. Cl.
CPC . *B60K 2350/1096* (2013.01); *B60R 2300/806* (2013.01); *B60R 2300/8026* (2013.01); *B60R 2300/8053* (2013.01); *B60R 2300/8093* (2013.01); *G06T 2215/16* (2013.01)

(56) References Cited

U.S. PATENT DOCUMENTS

2014/0222277 A1* 8/2014 Tsimhoni .............. B60W 30/00
 701/23
2015/0112571 A1* 4/2015 Schmudderich ...... B60W 30/08
 701/93

* cited by examiner

APPARATUS, SYSTEM AND METHODS FOR PROVIDING REAL-TIME SENSOR FEEDBACK AND GRAPHICALLY TRANSLATING SENSOR CONFIDENCE DATA

TECHNICAL FIELD

The present disclosure relates to sensor data processing and graphical processing. More specifically, the present disclosure is directed to improving the operation of automotive sensor system and the graphical representation of sensor data on a Human-Machine Interface (HMI).

BACKGROUND

Advanced driver assistance systems (ADAS) are systems developed to automate, adapt, and/or enhance vehicle systems for safety and better driving. Safety features in vehicles are designed to avoid collisions and accidents by offering technologies that alert the driver to potential problems, or to avoid collisions by implementing safeguards and taking over control of the vehicle. Adaptive features may automate lighting, provide adaptive cruise control, automate braking, incorporate GPS/ traffic warnings, connect to smartphones, alert driver to other cars or dangers, keep the driver in the correct lane, or show if vehicles and/or objects are present in blind spots.

While sensors are known to provide relatively accurate sensor readings (sensor data), there are certain driving conditions (e.g., rain, fog, small road debris, etc.) that may affect the accuracy of certain sensors. As ADAS systems become more prevalent in automobiles, it becomes more important to determine and communicate a confidence level on the accuracy and/or integrity of the sensors during operation. In certain instances, ADAS systems may fail to engage if the sensors are unable to obtain the necessary data. In other instances, ADAS systems may continue to operate when sufficient sensor data is received, but the sensor data is not fully accurate and/or contains certain deficiencies in the data. Accordingly, technologies and techniques are needed to establish a confidence (reliability) factor for sensor data. Furthermore, technologies and techniques are needed to graphically display one or more confidence factors for sensors in a manner that is not distracting and/or overwhelming for the driver/user.

SUMMARY

Various apparatus, systems and methods are disclosed herein relating to controlling operation of a vehicle. In some illustrative embodiments, a system is disclosed for processing sensor data in a vehicle, comprising one or more sensors configured to provide sensor data relating to at least one of a vehicle operating characteristic and/or a driving environment; a processing apparatus, communicatively coupled to the one or more sensors, wherein the processor is configured to receive data from the one or more sensors; and a display, operatively coupled to the processor, wherein the display is configured to display a scene comprising one or more images associated with the sensor data, wherein the processing apparatus comprises a probability processing module configured to process the sensor data to calculate a sensor confidence value representing an estimated accuracy for at least one of the one or more sensors, and wherein the processing apparatus comprises a graphics processing module configured to process the sensor confidence value to modify the scene on the display to represent the estimated accuracy for the at least one or more of the sensors.

In some illustrative embodiments, a method is disclosed for processing sensor data in a vehicle, comprising receiving sensor data from one or more sensors, wherein the sensor data relating to at least one of a vehicle operating characteristic and/or a driving environment; displaying a scene, via a vehicle display, comprising one or more images associated with the sensor data; processing the sensor data, via a processing apparatus comprising a probability processing module, to calculate a sensor confidence value representing an estimated accuracy for at least one of the one or more sensors; and processing the sensor confidence value and modifying the scene on the display via a graphics processing module, based on the processed sensor confidence value, to represent the estimated accuracy for the at least one or more of the sensors.

In some illustrative embodiments, a method is disclosed for processing sensor data in a vehicle, comprising receiving sensor data from one or more sensors, wherein the sensor data relating to at least one of a vehicle operating characteristic and/or a driving environment; displaying a scene, via a vehicle display, comprising one or more images associated with the sensor data; processing the sensor data, via a processing apparatus comprising a probability processing module, to calculate a sensor confidence value representing an estimated accuracy for at least one of the one or more sensors; processing the sensor confidence value and modifying the scene on the display via a graphics processing module, based on the processed sensor confidence value, to represent the estimated accuracy for the at least one or more of the sensors; receiving, in the processing apparatus, further data from the one or more sensors; processing, via the processing module, the further sensor data to calculate a new sensor confidence value representing a new estimated accuracy for at least one of the one or more sensors; and further modifying, via the graphics processing module, the scene on the display based on the new sensor confidence value.

BRIEF DESCRIPTION OF THE FIGURES

The present invention is illustrated by way of example and not limitation in the figures of the accompanying drawings, in which like references indicate similar elements and in which.

DETAILED DESCRIPTION

Figure 1:
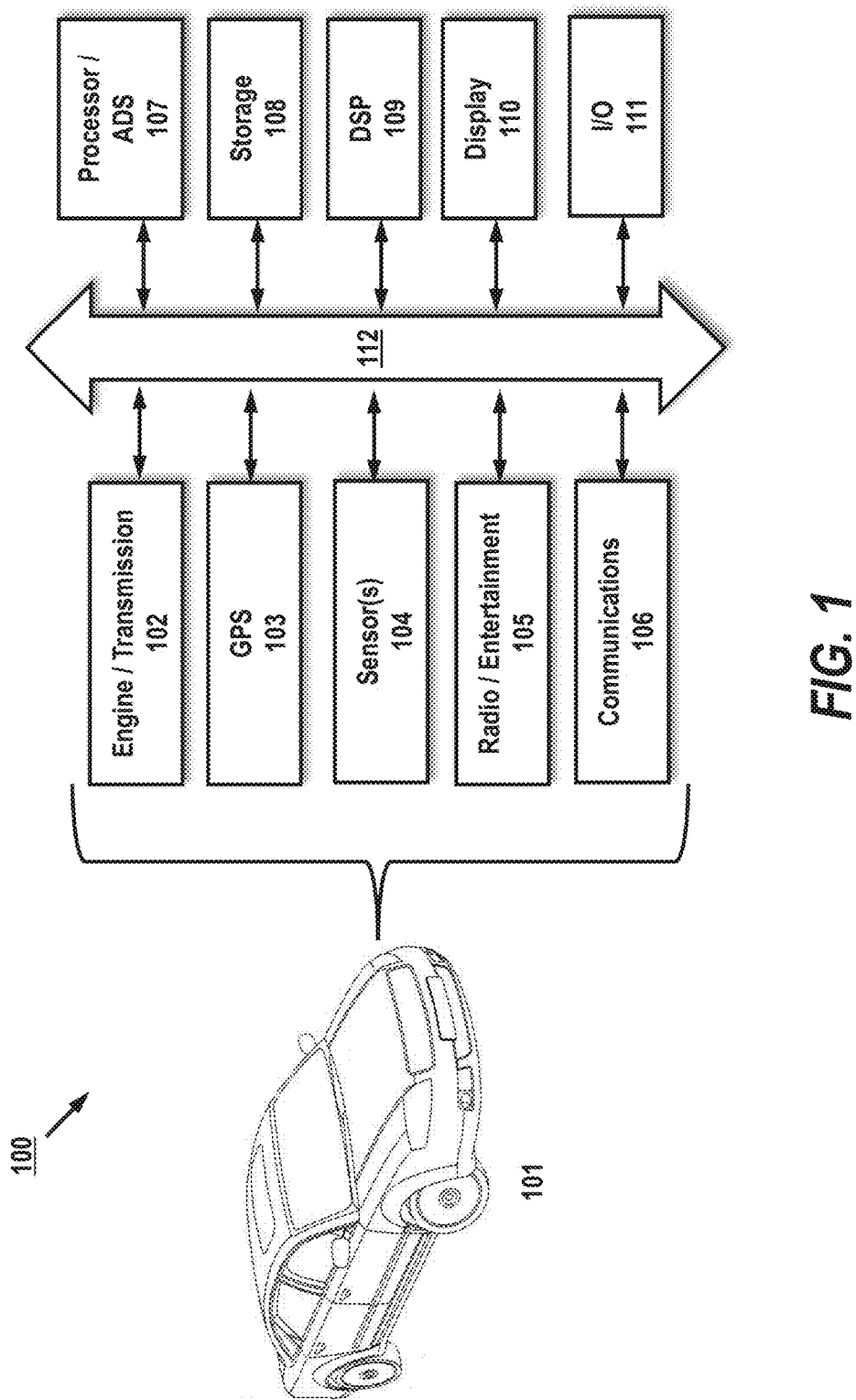
FIG. 1 shows an exemplary vehicle system block diagram showing multiple components and modules, together with a navigation system under an illustrative embodiment.

The figures and descriptions provided herein may have been simplified to illustrate aspects that are relevant for a clear understanding of the herein described devices, structures, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

The disclosed embodiments may be implemented, in some cases, in hardware, firmware, software, or any tangibly-embodied combination thereof. The disclosed embodiments may also be implemented as instructions carried by or stored on one or more non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

It will be understood that the term "module" as used herein does not limit the functionality to particular physical modules, but may include any number of software and/or hardware components. In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (working in connection with an operating system) to implement one or more functions and methods as described below. In this regard, the program code may be implemented in any desired language, and may be implemented as machine code, assembly code, byte code, interpretable source code or the like (e.g., via Scalable Language ("Scala"), C, C++, C#, Java, Actionscript, Objective-C, Javascript, CSS, XML, etc.).

Turning to FIG. 1, the drawing illustrates an exemplary system 100 for a vehicle 101 comprising various vehicle electronics modules, subsystems and/or components. Engine/transmission module 102 is configured to process and provide vehicle engine and transmission characteristic or parameter data, and may comprise an engine control unit (ECU), and a transmission control. For a diesel engine, module 102 may provide data relating to fuel injection rate, emission control, NOx control, regeneration of oxidation catalytic converter, turbocharger control, cooling system control, and throttle control, among others. For a gasoline and/or hybrid engine, module 102 may provide data relating to lambda control, on-board diagnostics, cooling system control, ignition system control, lubrication system control, fuel injection rate control, throttle control, and others. Transmission characteristic data may comprise information relating to the transmission system and the shifting of the gears, torque, and use of the clutch. Under one embodiment, an engine control unit and transmission control may exchange messages, sensor signals and control signals for any of gasoline, hybrid and/or electrical engines.

Global positioning system (GPS) module 103 provides navigation processing and location data for the vehicle 101. The sensors 104 provide sensor data which may comprise data relating to vehicle characteristic and/or parameter data (e.g., from 102), and may also provide environmental data pertaining to the vehicle, its interior and/or surroundings, such as temperature, humidity and the like, and may further include LiDAR, radar, image processing, and computer vision. Radio/entertainment module 105 may provide data relating to audio/video media being played in vehicle 101. The radio/entertainment module 105 may be integrated and/or communicatively coupled to an entertainment unit configured to play AM/FM radio, satellite radio, compact disks, DVDs, digital media, streaming media and the like. Communications module 106 allows any of the modules of system 100 to communicate with each other and/or external devices (e.g., devices 202-203) via a wired connection (e.g., Controller Area Network (CAN bus), local interconnect network, etc.) or wireless protocol, such as Wi-Fi, Bluetooth, NFC, etc. In one embodiment, modules 102-106 may be communicatively coupled to bus 112 for certain communication and data exchange purposes.

Vehicle 101 may further comprise a main processor 107 (also referred to herein as a "processing apparatus") that centrally processes and controls data communication throughout the system 100. In some illustrative embodiments, the processor 107 is equipped with advanced driver assistance modules that allow for communication with and control of any of the modules in vehicle 100. Storage 108 may be configured to store data, software, media, files and the like, and may include vehicle data, sensor data and driver profile data, discussed in greater detail below. Digital signal processor (DSP) 109 may comprise a processor separate from main processor 107, or may be integrated within processor 107. Generally speaking, DSP 109 may be configured to take signals, such as voice, audio, video, temperature, pressure, position, etc. that have been digitized and then process them as needed. Display 110 may be configured to provide visual (as well as audio) indicial from any module in FIG. 1, and may be a configured as a LCD, LED, OLED, or any other suitable display. The display 110 may also be configured with audio speakers for providing audio output. Input/output module 111 is configured to provide data input and outputs to/from other peripheral devices, such as key fobs, device controllers and the like. As discussed above, modules 107-111 may be communicatively coupled to data bus 112 for transmitting/receiving data and information from other modules.

Figure 2:
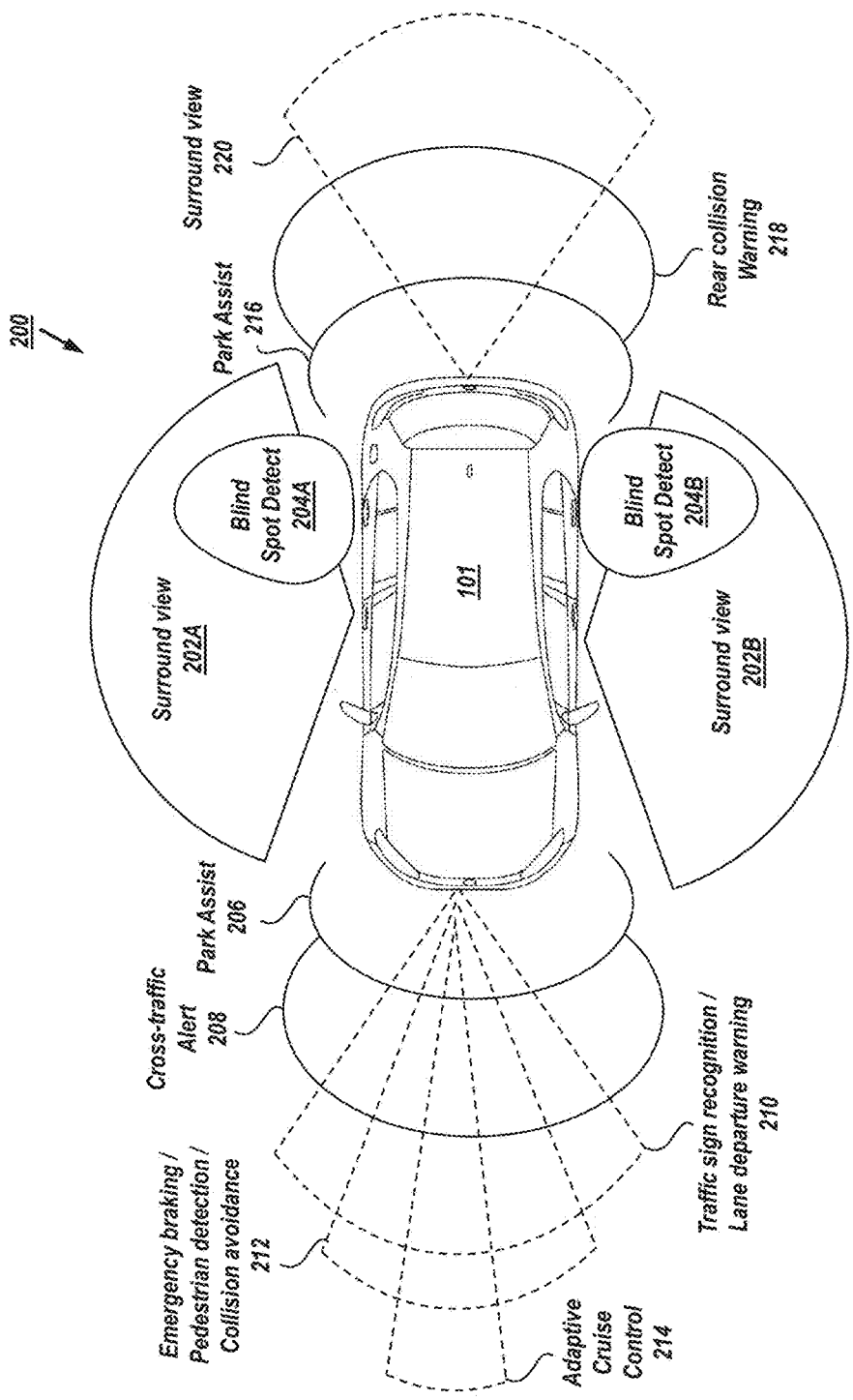
FIG. 2 shows a vehicle sensor system and configuration for sensing vehicle environment and characteristics and providing sensor data for processing under an illustrative embodiment.

FIG. 2 is an exemplary embodiment of an advanced driver system 200 that includes components of FIG. 1, where the sensors 104 may include LiDAR, radar, image processing, computer vision, and may also include in-car networking, as well as additional inputs from other sources separate from the primary vehicle platform via communications 106, such as Vehicle-to-vehicle (V2V), or Vehicle-to-Infrastructure (such as mobile telephony or Wi-Fi data network) communication and systems. Using various individual and/or combinations of sensors (e.g., 104), vehicle 101 may be equipped with surround view (202A, 202B), that may be configured, under one embodiment, using a camera in the middle of a front grille of the vehicle, dual ultra-wide-angle cameras from the side view mirrors along the flanks on the car, and another positioned above the license plate. During operation, software may stitch the images together and insert an image of the vehicle in the middle. Of course, those skilled in the art will recognize that other configurations are possible and contemplated in the present disclosure. Blind spot detectors 204A, 204B may be configured using sensors, such as surround view sensors (202A, 202B), and/or be equipped with independent sensors that use imaging and/or electromagnetic waves to detect other vehicles and/or objects present in the vehicle's blind spot.

A front portion of the vehicle 101 may be equipped with park assist 206, cross-traffic alert 208, traffic sign recognition and lane departure warning 210, emergency braking/pedestrian detection/collision avoidance 212 (collectively "collision avoidance") and adaptive cruise control 214. A rear portion of the vehicle 101 may be equipped with park assist 216, rear collision warning 218 and surround view 220. In some illustrative embodiments, park assist 206, as well as rear park assist 216 may utilize the processor/ADS 107 which may be operatively coupled to the vehicle's sensors 104, that may include sonar, one or more backup cameras and additional forward sensors on the front side fenders. The sonar and sensors may be configured on the forward and rear bumpers to detect obstacles, allowing the vehicle to sound warnings and calculate optimum steering angles during regular parking. During operation, the processor(s) (e.g., 107) may calculate steering angle data which are displayed on a navigation/camera touchscreen (e.g., 103) along with obstacle information. When the vehicle is shifted to reverse, the backup camera screen features parking buttons which can be used to activate automated parking procedures. When activated, the processor (e.g., 107) may calculate an optimum parallel or reverse park steering angles and then interfaces with the electric power steering systems (e.g., 102) of the vehicle 101 to guide the car into a parking spot. The cross traffic alert 208 and rear-collision warning 218 may be incorporated as independent modules or configured as part of the blind-spot detection (204A, 204B). Cross traffic alert 208 and rear-collision warning 318 utilize sensors for vehicle detection while in drive (208) or may activate when the vehicle is in reverse (218). During operation, they detect vehicles that might be crossing into a forward or rearward path, and, when an oncoming vehicle is detected, the system generates an alert.

Traffic recognition/lane departure warning module 210 may include a forward-facing camera that may be incorporated with other modules of FIG. 2, and is configured to scan a road ahead for traffic signs. This camera is connected to character recognition software, which may monitor and process any changes described by the signs, and relaying it onto the car's instrument panel. A lane departure module of 210 captures a moving view of the road ahead. The digitized image is parsed for straight or dashed lines (i.e., the lane markings). As the car deviates and approaches or reaches a lane marking, the vehicle issues a warning. The lane departure module 210 may incorporate a lane assist feature, where, if a vehicle reaches a lane marking, the vehicle, via assisted steering, may move itself away from the marker.

Sometimes the steering change may be effected by braking the opposite front wheel, pivoting the vehicle.

Collision avoidance module 212 may be configured as a radar (all-weather) and may incorporate laser and camera to detect an imminent collision. Once the detection is processed, the module 212 may provide a warning to the driver when there is an imminent collision, and/or control the vehicle autonomously without any driver input (by braking or steering or both). Adaptive cruise control module 214 (or "autonomous cruise control") may be a laser-based system and/or radar-based system, where the sensors automatically adjust the vehicle speed to maintain a safe distance from vehicles ahead. If configured as a cooperative adaptive cruise control system. the module 214 further extends the automation of navigation by using information gathered from fixed infrastructure such as satellites and roadside beacons, or mobile infrastructure such as reflectors or transmitters on the back of other vehicles.

Figure 3:
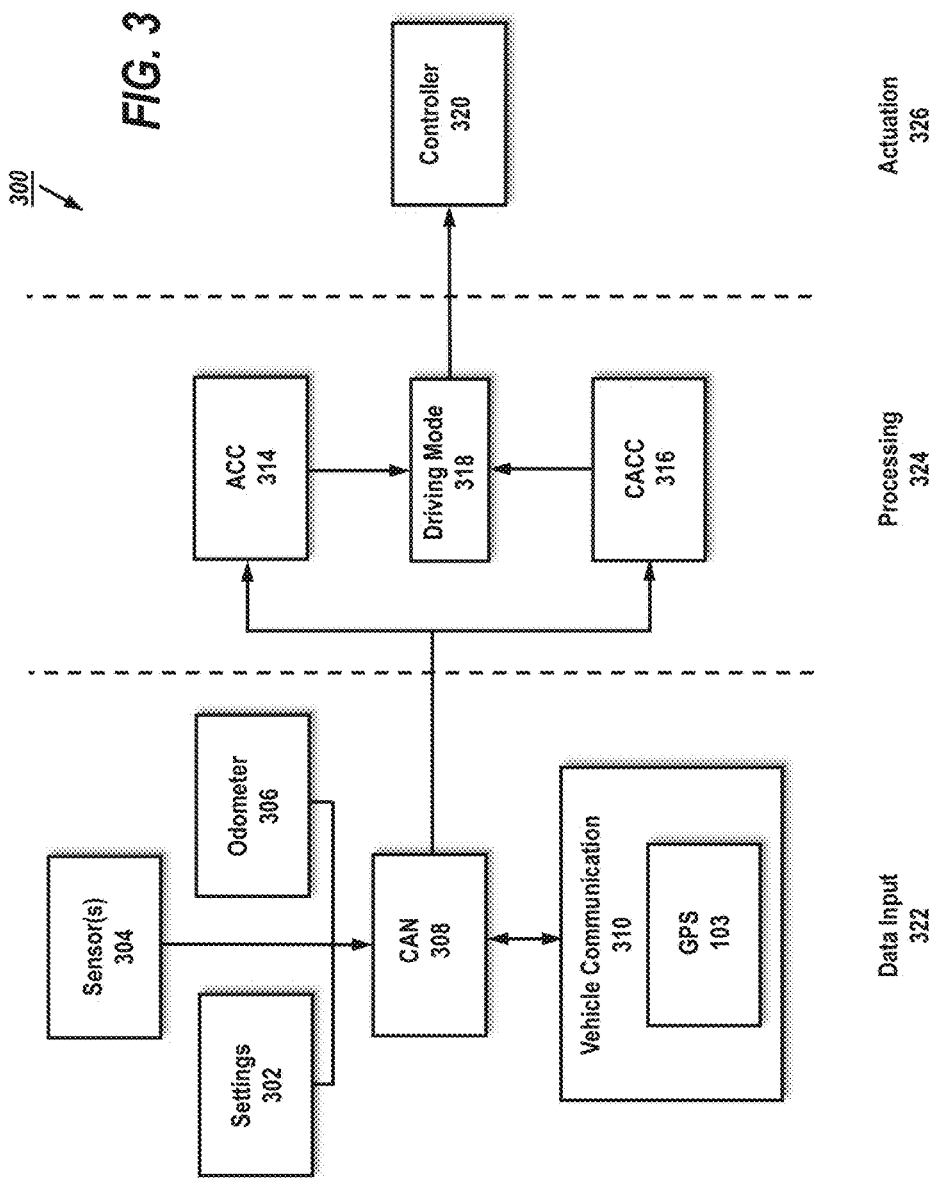
FIG. 3 shows a block diagram for a sensor architecture configured to process sensor data in a vehicle under an illustrative embodiment.

Turning to FIG. 3, the drawing shows a block diagram for a sensor architecture 300 configured to process sensor data in a vehicle (e.g., 101) under an illustrative embodiment. In this example, the sensor architecture may be configured to have a data input portion 322, a processing portion 324, and an actuation portion 326. Under an illustrative embodiment, the data input portion 322 may include all information received from the sensors installed in a vehicle, including vehicle communication module 310, which may include technologies like Vehicle-to-Vehicle (V2V) and Vehicle-to-Infrastructure (V2I) communications that may communicate, or be integrated with, the GPS 103. Utilizing V2I technology, the vehicle communication module 310 may receive data/information relating to hazardous situations (e.g., congestions, accidents, obstacles etc.), merging assistance, intersection safety, speed management, and rail crossing operations, among others. Additional data/information may include, but is not limited to, traffic jam notification, prior recognition of potential traffic jams, dynamic traffic light control, dynamic traffic control, and connected navigation. Utilizing V2V technology, the vehicle communication module 310 may receive data/information relating to warnings on entering intersections or departing highways, hazardous location warning (e.g., obstacle discovery, reporting accidents), sudden stop warnings (e.g., forward collision warning, pre-crash sensing or warning) and lane change/keeping warnings/assistance. Additional data/information may include, but is not limited to, enhanced route guidance and navigation, intelligent intersections data (e.g., adaptable traffic lights, automated traffic intersection control, green light optimal speed advisory, merging assistance (e.g., entering an on-ramp to a limited access roadway), variable speed limits, pull-over commands and speed measurements.

In addition to information/data generated from vehicle (e.g., 101) data, information/data from other vehicles may be received in vehicle communication module 310, such as speed, acceleration, distance to preceding vehicle, current time gap, control activation, and so on. All data from vehicle communication module 310 may be included on the CAN bus data structure and communicated to CAN module 308. The information/data may also include detection and assignment of vehicle position sequence, which may be carried out by the vehicle communication module 310 using the GPS 103 and may utilize Wider Area Augmentation System (WAAS) differential corrections.

Vehicle (e.g., 101) information/data is also obtained from the on-board sensors 304 (e.g., 104), which may include any of the sensors described herein and/or otherwise known in the art, as well as odometer data, which may include speed and acceleration data. Settings module may include flag signals to provide information/data on vehicle and sensor setting, as well as information regarding the interaction of the driver with the driver interface (e.g., activation or deactivation of the system or vehicle setting selection). This may include data from driver interface buttons and inputs associated with the ADAS system, which may include autonomous cruise control (ACC) and/or cooperative adaptive cruise control (CACC) settings and/or control signals. Information/data from settings module 302, sensors 304 and odometer 306 may be communicated to CAN module 308, wherein the CAN module 308 may be configured to communicate the data to processing portion 324.

Processing portion 324 may include an ACC 314 and/or a CACC 316 that may comprise high-level and low-level controllers that are accessible to a driver, and may allow a driver to switch between them during operation to establish a driving mode (e.g., normal mode, eco-driving mode, sport mode, snow mode, etc.), which may be communicated to controller 320 for actuating the mode. For switching between modes, a control code may read the CAN bus information from a transmission mode selection button. As an example, when a sport mode is chosen, a high level controller (e.g., via controller 320) may take the CACC controller output. When any of the other modes is chosen, an ACC controller output may be sent to a low-level controller (e.g., via controller 320). The CACC controller can be deactivated in the same way as the ACC, either using the driver interface inputs/buttons or pressing the brake pedal. The actuation portion 326 may be configured to execute target reference commands from the processing portion 324. As an example, the low-level controller may be configured to convert the target speed commands into throttle and brake actions, via the ACC controller.

Figure 4:
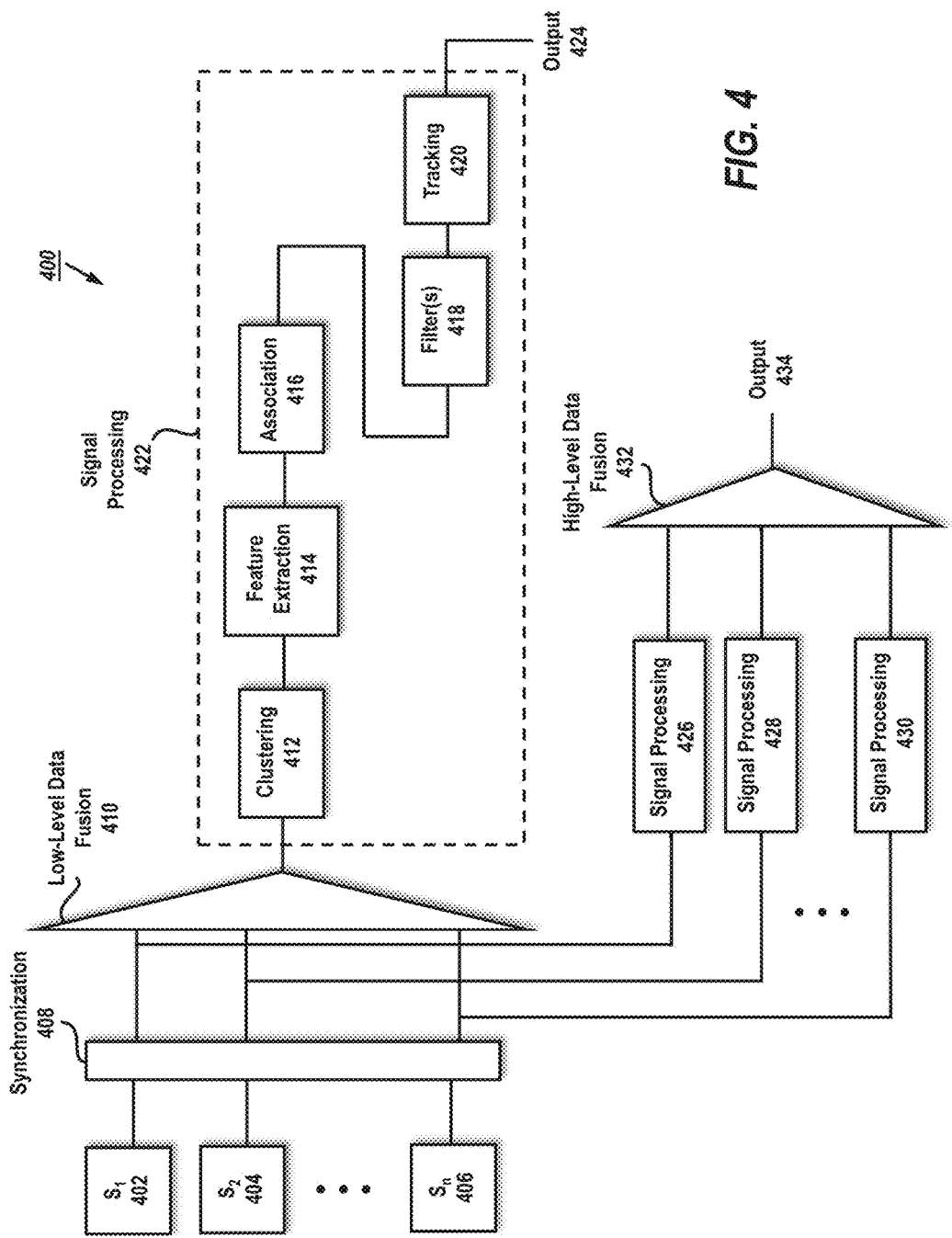
FIG. 4 shows a configuration for performing high-level and/or low level sensor fusion for sensor data under an illustrative embodiment.

In certain illustrative embodiment, raw sensor data may be used for configuring and controlling ADAS systems. However, ADAS system performance may be improved by incorporating sensor fusion to the raw data. The signal processing of fusion may advantageously incorporate the refinement of raw sensor data to an abstract context description as well as the actual fusion step. Depending on the fusion paradigm used, sensor data may be fused on a low level of abstraction, high level of abstraction or on multiple levels of abstraction (hybrid approach). Turning to FIG. 4, a configuration is shown for performing high-level and/or low level sensor fusion system 400 for sensor data under an illustrative embodiment. The sensor system 400 may be integrated into the sensors 104 of FIG. 1, or may be configured as a separate sensor arrangement. As can be seen in the figure, information/data may be received from one or more sensors $S_1$-$S_n$ (402-406), and synchronized in synchronization module 408 before being subjected to low-level data fusion in module 410. The output of the low-level data fusion 410 is the subjected to signal processing in signal processing module 422, which may include, but is not limited to a clustering module 412, feature extraction module 414, association module 416, filter(s) 418 and tracking module 420. The processed low-level data fusion output 424 may be communicated to processor 107 for further processing, which may include graphics processing that is described in greater detail below. Each output of synchronization module 408 may also be communicated to respective signal processing modules 426-430, which may be configured similarly as signal processing module 422. The output of each of the signal processing modules 426-430 may then be subjected to high-level data fusion in 432, wherein the output 434 may also be communicated to processor 107 for further processing, which may include graphics processing that is described in greater detail below.

In the example of FIG. 4, a common temporal and spatial base of the sensor data (402-406) should be established through data synchronization prior to data integration. For signal processing (e.g., via 422), the clustering module may assemble groups of data points that are believed to be originating from the same real world entity. The data clusters may then be processed and analyzed by the feature extraction module 414 to derive relevant attributes of the clustered entities (e.g. distance, velocity, yaw rate. acceleration, width, height, length, weight, etc.). In order to establish a timely correlated record of the objects, the association of objects from the last time step with the currently present objects may be performed in association module 416. To reduce the effect of sensor inaccuracy and signal noise, filter module 418 may execute one or more filter algorithms and may additionally provide state predictions for a next iteration's association step. High-level fusion architectures may be configured to integrate context data (e.g., from signal processing 426-430) based on associated and filtered sensor data whereas low-level fusion architectures may be configured to integrate sensor data (e.g., from signal processing 422) at an early stage of signal processing.

Under an illustrative embodiment sensor fusion for system 400 may utilize Kalman filtering, or any other suitable algorithm. Under Kalman filtering, an iterative process may be performed, where one or more filters may calculate a weighted state update $\bar{X}_k$ of a state prediction $\bar{X}_{\bar{k}}$ from a previous iteration, based on an actual measurement $\bar{Z}_k$ and a Kalman gain matrix $K_k$:

$$\bar{X}_k = \bar{X}_{\bar{k}} + K_k(\bar{Z}_k - C\bar{X}_{\bar{k}})$$

The Kalman gain may be derived from signal covariance values. Of course, other filter approached, such as particle filters, may be employed depending on the application. The association of objects from different time steps may be done using greedy approaches (e.g., Nearest Neighbor (NN) and variants), Joint Probabilistic Data Association (JPDA) or Multiple-Hypothesis Testing (MHT). These algorithms may be used to tailor to different computational loads and/or ability to find local (e.g., iterative NN) or global optimal (e.g., JPDA, MHT) applications for sensor data.

It should be understood by those skilled in the art that different approaches of fusing data from multiple sensors/sources are contemplated in the present disclosure, and that different levels of abstraction (i.e., "fusion paradigm") may be utilized on integrated data. Generally speaking, the fusion paradigms used for a sensor system (e.g., 400) may include, but are not limited to, low-level fusion of raw sensor data (e.g., where near-raw sensor data or sensor data that has been minimally processed), high-level fusion of sensor data (e.g., sensor data processed independently to a high level of abstraction) and hybrid fusion of sensor data, which may include multiple levels of abstraction. The fusion system 400 may be incorporated as a separate vehicle system (e.g., 100) component, or may be incorporated within a vehicle's processing system (e.g., 107)

Figure 5:
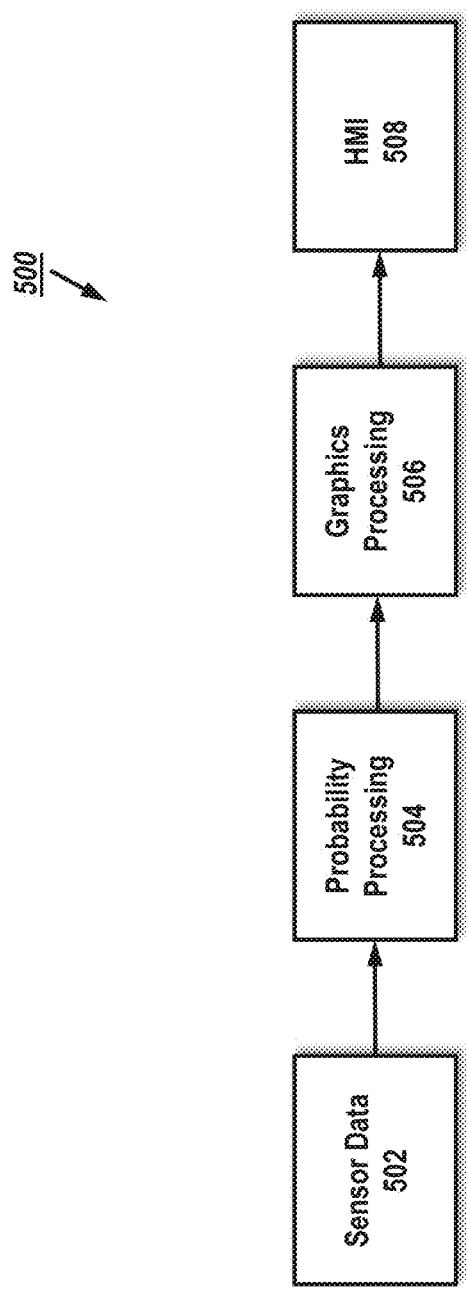
FIG. 5 shows a block diagram for performing probability processing on sensor data to establish a confidence factor, wherein the confidence factor result may be used for graphical rendering and display under an illustrative embodiment.

Turning to FIG. 5, the drawing illustrates a system block diagram 500 for performing probability processing on sensor data to establish a confidence factor, wherein the confidence factor result may be used for graphical rendering and display under an illustrative embodiment. In this example, sensor data 502 may be raw sensor data, and/or processed sensor data (e.g., fused sensor data via 400). The sensor data 502 may be subjected to probability processing via module 504, where a processor (e.g., 107) may determine a confidence value for individual sensors, and/or a confidence value for a collective group of sensors. In an illustrative embodiment, the probability processing may be incorporated as part of the fusion process (e.g., 400).

In this example, as incoming data is received and monitored, confidence values may be assigned to each sensor measurement. For calculating these values, probability processing module 504 may process the individual behavior of each sensor, and/or the collective behavior of groups of related sensors. A history of measurements from each sensor (e.g., $S_1$-$S_n$ (402-406)) may be processed to analyze the specific characteristics, such as the work range of the sensor, differences between two consecutive values, estimations of a current direction of medium term change, etc. From this history, a histogram may be formed for each characteristic. From the histogram, a possibility distribution may be defined, and the current values of the possibility distributions for each of the characteristics may be evaluated. Individual confidence values for each sensor may be calculated from the estimations utilizing a t-norm (e.g., the minimum). The obtained value may be interpreted as the normality of the sensor individual behavior. The sensor data may be received and processed for a predetermined amount of time in order to establish an initial determination of possibility distributions. Once the initial distribution is determined, a new possibility distribution may be calculated over another predetermined period of time in parallel with the assignment of confidence values. Such a configuration may advantageously result in a possibility distribution that is continuously evolving from the initial state to a state that is closer to a current sensor behavior.

In an illustrative embodiment, after individual sensor behavior is analyzed, the collective behavior of groups of related sensors may be analyzed. Here, the probability module 504 of the system 500 may distinguish between sensors independently measuring the same physical variable or several sensors measuring simultaneously several numerically related physical variables. In one example, the probability module 504 may be configured with an expert system including a knowledge base and inference engine, where expert knowledge about the collective behavior of the sensors may be expressed in terms of probabilistic rules that may monitor sensor behavior. If the same physical variable is being monitored, the rules may determine a grade of coincidence in the values and the evolution of the values. If different related variables are being measured, the rules may reflect the agreement of the variables evolution with their relationships, and several collective confidence values may be determined from the rules by means of logical inference. In one example, pairwise confidence values may be obtained to each measurement. In another example, one collective confidence value may be assigned to each sensor.

In one example, individual confidence values and one or more collective confidence values may be fused into a final confidence value using a suitable function, such as $$\sqrt{w_1\alpha_1^2 + w_2\alpha_2^2 + \ldots + w_n\alpha_n^2}$$

where $\alpha_i$ are the confidence values obtained, and $w_i$ are the weights of each confidence value in the final fusion ($0 < w_i < 1$, $w_1 + \ldots + w_n = 1$). The weights may accordingly be determined with the expert knowledge about the characteristics of the sensors (e.g., precision, sensitivity, expected reliability, etc.). The closer to 1 the confidence values are, the closer to 1 the final confidence value. Accordingly, it makes it easier to tune the impact of each confidence value in the final fusion, and the function presents in practice smoother changes than a linearly weighted average. It should be understood by those skilled in the art that, depending on the sensor application, techniques such as probability density functions may be advantageous to provide confidence values for the sensors, but other suitable techniques, such as fuzzy logic, neural networks and the like are also contemplated in the present disclosure, along with other machine-learning techniques known in the art.

In an illustrative embodiment, one or more confidence values generated in module 504 may be used as a basis to perform graphical processing in module 506 for display on a display screen on a human-machine interface (HMI) 508. In one example, the confidence value may be used as a basis for rendering and/or modifying images on an HMI having a display including, but not limited to, instrument clusters, digital instrument panels, heads-up displays, navigation displays, entertainment module displays, and the like. In an illustrative embodiment, the confidence value may be transformed via graphics processing to convert one or more color characteristic in the display alone or in combination, including, but not limited to, hue (color), saturation (or "chroma", which determines the intensity or purity of a hue), lightness (i.e., the relative degree of black or white mixed with a given hue) and temperature (i.e., the perceived warmth or coolness of a color). Preferably, the HMI should be configured to support two-dimensional and three-dimensional graphics and animation, and may include a physics engine, particle effects, blending and colorization. Illustrative models include display systems based on NVidia Drive™ CX, and Visteon Lightscape™ D3.2 platforms, among others.

Accordingly, as confidence values are generated in probability processing module 504, each confidence value is used by graphics processing module 506 to generate a graphical image, modification, and/or effect on the display of the HMI 508. As an example, an instrument cluster may display an image of a vehicle detected by one or more sensors. As confidence values are received in graphics processing module 506, these values may represent sensor accuracy confidence that is less than 100%. As confidence values trend away from 100%, graphics processing module may, in one example, change the hue of the displayed vehicle image (e.g., from blue to red) in real time to represent a decrease in sensor confidence. The changes to the image may be incremental or gradual, depending on the application. In an illustrative embodiment, a graphical symbol may be displayed concurrently with the displayed image, indicating a numerical sensor confidence value (e.g., 0-100%). In one example, the graphics processing module may change the graphical symbol (e.g., hue) concurrently with the image during display.

The ability to graphically represent the sensor confidence to the driver advantageously provides real-time feedback to the driver, which allows a driver to make more informed decisions regarding sensor information and therefore provide for a more robust and more safe driving experience. Using any of a variety of techniques disclose herein, the operation and feedback capabilities of sensor systems in a vehicle setting are improved.

In an advantageous illustrative embodiment, sensor data may be processed to generate volumetric imaging overlays onto an HMI display to indicate sensor confidence. For example, confidence values may be used as an input to generate additional volumetric light and/or volumetric objects of varying transparencies relative to the object (e.g., vehicle image) normally displayed on the HMI screen. Once such example includes the rendering of volumetric textures, such as a "volumetric fog" over the one or more display images, which may advantageously provide an intuitive display of sensor confidence for a driver without overly cluttering the display and/or provide distracting additions to a driver's console.

Under a simplified example of volumetric fog rendering, the graphics processing module 506 may define a texture (e.g. fog) having an initial density that may be fixed, which assumes that incoming light at each particle is constant, and that each particle of texture emits the same amount of light, and in all directions. Under these assumptions, the amount of contributing light may be equal to the area of fog between a pinhole (using a pinhole camera model in this example) and the point in the screen. A simplified texture (fog) model may be calculated for each color channel using an intensity of pixel $(1-L_x*A_x)*(I_r)+L_e*A_e*I_f$, where $L_s$ represents the amount of light absorbed by the fog, $A_s$ represents an area of fog absorbing light, $I_r$ represents the intensity of light coming from the scene, $L_e$ represents the amount of light emitted by the fog, $A_e$ represents the area of fog emitting light and $I_f$ represents the intensity of the light coming from the fog. Since the area of fog emitting light is the same for the area of fog absorbing light, and the assumption is made that the amount of light emitted is the same percentage as absorbed, then this may be further simplified as $(1-A*L)*(I_r)+L*A*I_f$ where L is the amount of light absorbed/emitted by the fog (fog density), A represents the area of the fog, $I_r$ represents the intensity of light coming from the scene and $I_f$ represents the intensity of the light coming from the fog.

Under a per pixel operation, the incoming light would already be computed by rendering the scene as it would normally appear. The amount a pixel changes to the fog color may be proportional to the amount of fog between the camera and the pixel. For determining fog depth at each pixel location, a standard depth fog may use the Z (or w) value as the density of fog under a simplified illustrative embodiment. In this example, the fog would create an omnipresent fog. at all points in a scene on a HMI display. In an illustrative embodiment, a polygonal hull may be modeled by graphics processing module 506 to represent the fog and to compute the area of fog for each pixel rendered on the scene. The shaft of fog along a ray (e.g., measured from the camera, through the fog, and to the object) can be closely approximated subtracting the w depth a ray enters a fog volume from the w depth of the point it leaves the for volume, and multiplying by some constant. In an illustrative embodiment, this may be processed by applying a form of Stoke's theorem, where all but 2 of the terms cancel, since the flux may be considered constant in the interior of the fog.

Finding the point(s) where a ray enters a fog volume may be computed by rendering the fog volume and reading the w value. Finding the ray on the other side of the fog volume may be determined by culling away polygons not facing the camera. However, any surface not facing the camera would be the backside of the fog volume, the inside of a fog volume may be rendered by reversing the culling order and drawing the fog again. To get a total amount of fog in an HMI display scene, a buffer (e.g., via graphic processing module 506) containing the front side w values of the fog volume may be subtracted from the buffer containing the back side w values of the fog. w pixel operations may be performed using a vertex shader or other suitable module, where the w may be encoded into the alpha channel, thereby loading the w depth of every pixel into the alpha channel of the render target. After the subtraction, the remaining w value represents the amount of fog at that pixel. When rendering a fog with an object inside it, the graphics processing module 506 may first clear the buffer and render the scene into an off-screen buffer (A), encoding each pixel's w depth as its alpha value (Z buffering enabled). The backside of the fog may be rendered into the off-screen buffer (A), where each pixel's w depth is encoded. The scene may be rendered into another off-screen buffer (B) (or copied from buffer A), using the w depth alpha encoding, where the front side of the fog volume may be rendered into off-screen buffer B with w alpha encoding. Since the fog volume should be in front of parts of the object that are obscured by fog, it will replace them at those pixels. Finally, the two buffers (A, B) may be subtracted in screen space using the alpha value to blend on a fog mask.

Of course, it should be understood by those skilled in the art that the examples provided above are simplified examples that are disclosed herein for a better understanding of the underlying technology, and that numerous other techniques known in the graphics processing arts may be applied to provide greater detail and/or enable other effects to be implemented during fog rendering. The specific examples disclosed above and elsewhere herein are not intended to be limiting.

Figure 6:
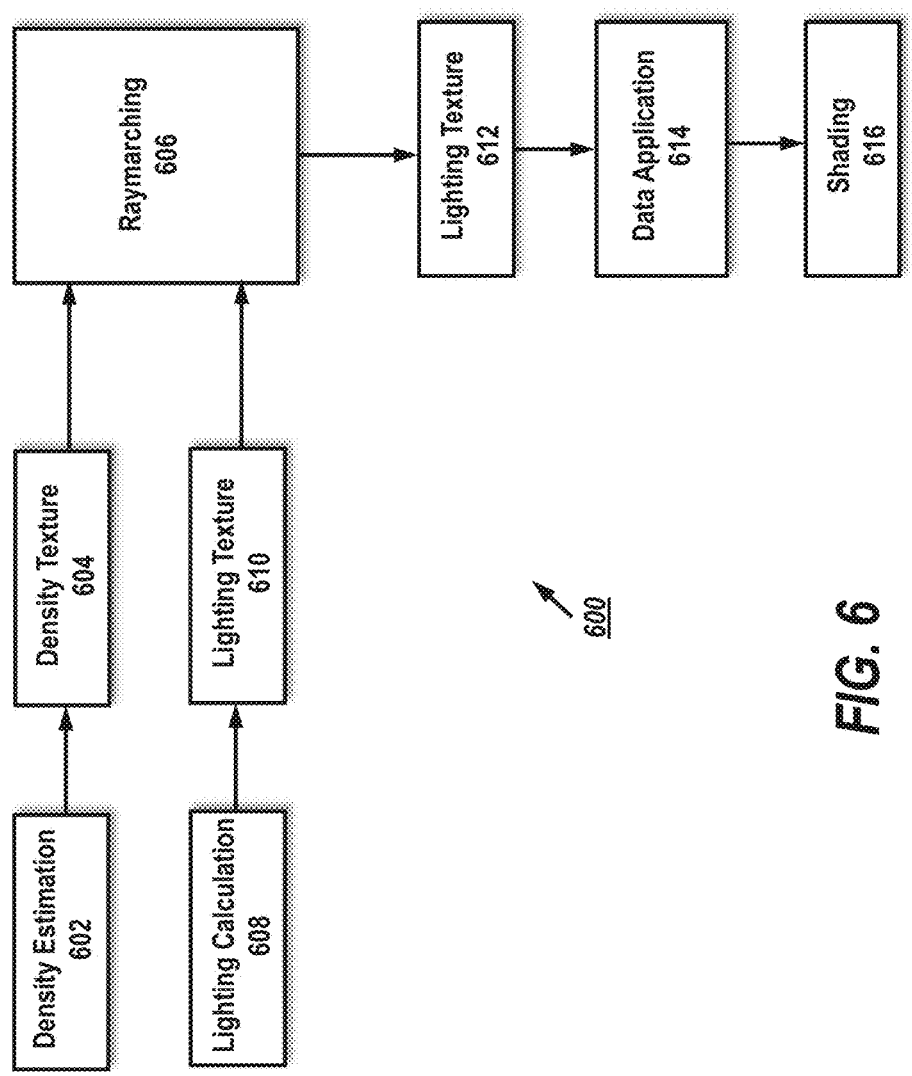
FIG. 6 shows a block diagram for graphically processing one or more confidence factor results to providing volumetric texturing to sensor data displayed to a user under an illustrative embodiment.

FIG. 6, shows a block system 600 diagram for graphically processing one or more confidence factor results to providing volumetric texturing to sensor data displayed to a user under an illustrative embodiment. System 600 may be incorporated as part of graphics processing module 506, or may be configured as a separate processing entity. In this example, system 600 includes a density estimation module 602 and density texture module 604 to generate volumetric data. Density estimation module 506 estimates a density for volumetric fog, where a density calculation may be based on one or more octaves of Perlin noise that may be optionally animated, and subjected to vertical media density attenuation. A scattering coefficient may be stored in an alpha channel of a volume texture buffer/database that may be part of a density texture module 604.

Lighting calculation module 608 and lighting texture module 610 is optional, but may be advantageous for providing lighting and shadowing effects on volumetric fog. Lighting calculation module 608 may accumulate lighting effects from a main light, a constant ambient term and multiple dynamic point lights intersecting with a view frustum to achieve a desired atmospheric lighting effect. Technologies such as exponential shadow maps may be also used to achieve shadowing from the main light. Lighting information may be modulated by density in an RGB channel of volumetric texturing in lighting texture module 610.

The outputs of modules 602-604 and 608-610 may be provided to raymarching module 608 that performs a volume ray casting using a form of ray tracing in which imaginary light rays are computed where they intersect with solid parts of an object/fog model, and are also sampled and modified as they pass through space. In an illustrative embodiment, for information stored in volume textures in lighting texture module 612, 2-D raymarching may be performed on the volume and the result may be stored in volume slices. The textures may be aligned with the camera frustum, where frustum to cuboid direct mapping may be performed using normalized coordinates (e.g., width×height axis), where exponential depth distribution may be performed for depth slices. In data application module 614, the data may be configured to be applied on a HMI display image either in a forward manner (e.g., directly when drawing objects) or a deferred manner (e.g., as full screen quad pass). Final application may occur via a bilinear look-up from a 3D texture, and application of a fused multiply-add operation. Shading module 616 may comprise a compute shader that accumulates in-scattered light and fog density at every step to generate a volumetric texture with information at every texel including amounts of light in-scattered from a camera to a given 3D point, and how much density of participating media was accumulated, which also describes an amount of out-scattered incoming light.

Figure 7:
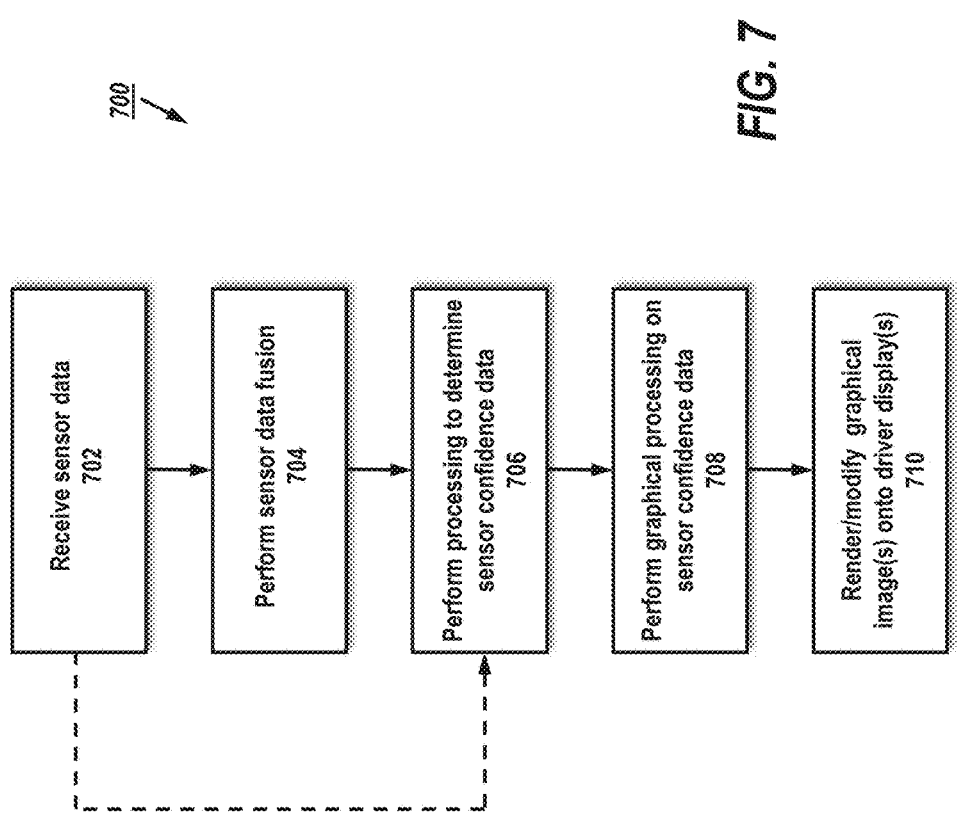
FIG. 7 shows a process for receiving sensor data, performing sensor data fusion, performing processing to determine sensor confidence data, perform graphical processing on sensor confidence data and rendering and/or modifying graphical images relating to the sensor confidence data on a display under an illustrative embodiment.

FIG. 7 shows a process for receiving sensor data, performing sensor data fusion, performing processing to determine sensor confidence data, perform graphical processing on sensor confidence data and rendering and/or modifying graphical images relating to the sensor confidence data on a display under an illustrative embodiment. In block 702 a vehicle processing apparatus (e.g., processor 107), may receive sensor data from one or more sensors (e.g., 402-406) and perform sensor data fusion in block 704, similar to the illustrative embodiments discussed above in connection with FIG. 4 and elsewhere herein. In some illustrative embodiments, such as those in which a single sensor reading is used, it may not be necessary to perform fusion.

In block 706, the processor, which may include graphics processing module 506, performs processing to determine sensor confidence data, and, based at least in part on the sensor confidence data, perform graphical processing on sensor confidence data using any of the techniques described herein. In block 710, the processor may render/modify graphical images onto the HMI driver display.

Figure 8C:
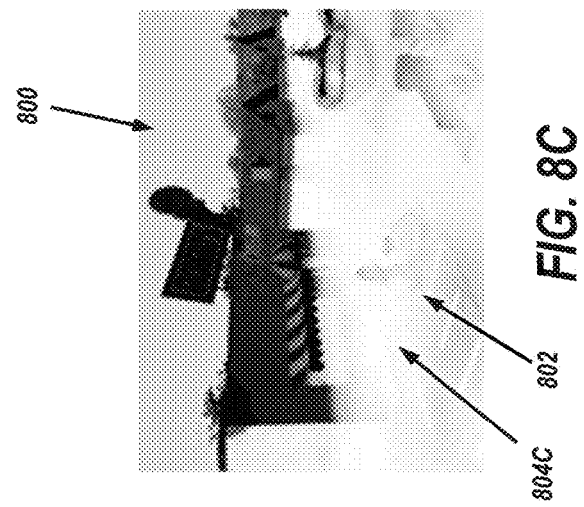
FIGS. 8A-8C show different simplified and simulated examples of graphical rendering of a sensor confidence value on a vehicle display under illustrative embodiments.
Figure 8A:
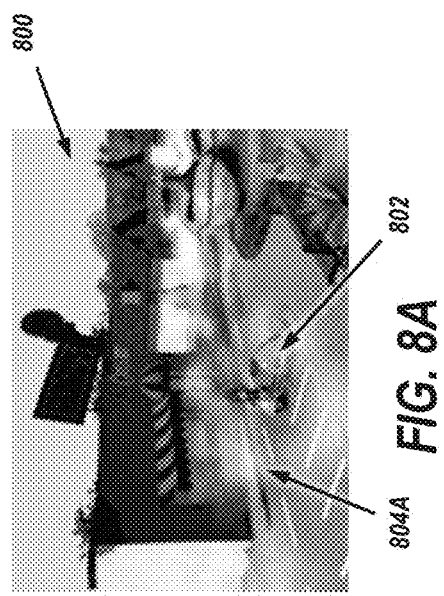
Figure 8B:
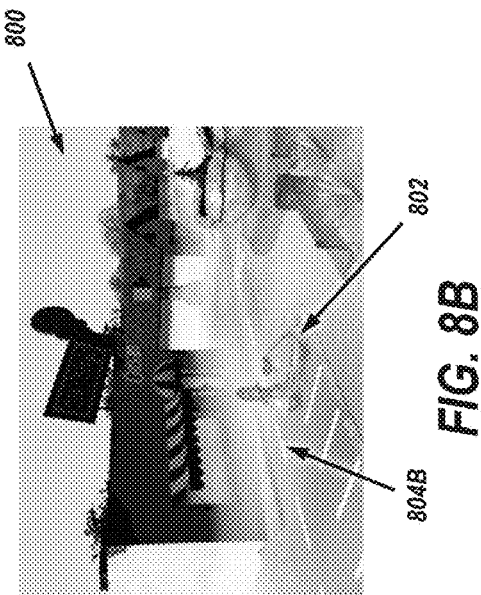

FIGS. 8A-8C illustrate different examples of graphical rendering of a sensor confidence value on a vehicle display (e.g., 110) under illustrative embodiments. In these examples, the display includes a display scene 800 that includes one or more objects, where one object of interest is a scooter 802. The scene 800 may be provided by one or more cameras and may include data from one or more vehicle sensors. In the example of FIG. 8A, the sensor confidence value is shown as being relatively high, which results in the rendering of a volumetric fog 804A that is relatively transparent and not dense, indicating to the driver that the sensor confidence is relatively high. In the example of FIG. 8B, the sensor confidence value is shown as being somewhat high, which results in the rendering of a volumetric fog 804B that has a higher density indicating to the driver that the sensor confidence is somewhat high, but not optimal. In the example of FIG. 8C, the sensor confidence value is shown as being relatively low, which results in the rendering of a volumetric fog 804C that is relatively dense, indicating to the driver that the sensor confidence is relatively low.

In summary, the present disclosure provides a plurality of embodiments demonstrating the effectiveness of sensor processing to allow a vehicle system to provide near real-time feedback of sensor confidence data to a driver, and graphically process the sensor confidence value so that it is presented to the driver in a new and intuitive way. As vehicle instrument clusters develop, presenting the diver with a visual "picture" of lanes, and other vehicles on the roads becomes useful, particularly while an autonomous system is engaged. By rendering an overall confidence rating of sensors, a driver may use this information to decide if the autonomous system should be engaged or disengaged. Conventionally, sensor confidence data is not presented on an HMI because of the sheer number of sensors involved, and the ability of a driver to quickly and safely glance at the display to determine sensor confidence.

Collecting all the sensor confidence factors from sensors (e.g., LiDAR, radar, cameras, etc.) and applying a probability density calculation can produce a single global sensor confidence value that can be used as an input to render fog density over a scene enables the driver to quickly and intuitively determine an accurate level of sensor confidence. Graphics processing (e.g., 506) may render clouds or fog with differing densities as the solution to the time dependent or independent Schrodinger wave equations where various inputs such as phase and energy produce a distribution or a probability of finding an electron at a certain orbit.

The sensor confidence values may change in real time as driving conditions change and the information should be presented in a manner that a quick glance (even in autonomous driving mode) can give a good representation of sensor confidence to the driver. In some illustrative embodiments, sensor confidence values may be calculated at fixed intervals with a special weight associated to each that can change in real time, depending on the sensor. For example, a LiDAR value is typically not affected by lighting or weather conditions as much as camera sensors are. To compensate for this, a global average may be used. Alternately or in addition, the sensor inputs may be used for a probability density function over a fixed spatial area (e.g., mobileye field of view). This has an advantage of providing localized density probabilities that may be presented as volumetric fog rendering over the scene representing sensor confidence about lane detection, lane position of our car, and surrounding vehicles. In some illustrative embodiments, an inverse density function may be used for fog rendering, where high density fog (e.g., 804C) represents a low confidence, while low density fog (e.g., 804A) may represent a high confidence that can be evaluated quickly at a glance by the driver. In some illustrative embodiments, colors may be introduced to the fog uniformly or at different regions to represent additional information, such as sensor type.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system for processing sensor data in a vehicle, comprising:
    one or more sensors configured to provide sensor data relating to at least one of a vehicle operating characteristic and/or a driving environment;
    a processing apparatus, communicatively coupled to the one or more sensors, wherein the processor is configured to receive data from the one or more sensors; and
    a display, operatively coupled to the processor, wherein the display is configured to display a scene comprising one or more images associated with the sensor data,
    wherein the processing apparatus comprises a probability processing module configured to process the sensor data to calculate a sensor confidence value representing an estimated accuracy for at least one of the one or more sensors,
    and wherein the processing apparatus comprises a graphics processing module configured to process the sensor confidence value to modify the scene on the display by generating a volumetric fog comprising a density that is dependent upon the sensor confidence value to represent the estimated accuracy for the at least one or more of the sensors.

2. The system of claim 1, wherein the processing apparatus is configured to perform fusion on the sensor data prior to calculating the sensor confidence value.

3. The system of claim 1, wherein the processing apparatus is configured to apply one or more weights to the sensor data for calculating the sensor confidence value, wherein the one or more weights are determined by a type of sensor providing the sensor data.

4. The system of claim 1, wherein the processing apparatus is configured to receive further data from the one or more sensors and the probability processing module is configured to process the further sensor data to calculate a new sensor confidence value representing a new estimated accuracy for at least one of the one or more sensors, and wherein the graphics processing module is configured to modify the density of the volumetric fog based on the new sensor confidence value.

5. The system of claim 1, wherein the graphics processing module is configured to modify the scene on the display by modifying at least one of a hue, a saturation, a lightness and/or a temperature of the scene based on the sensor confidence value.

6. The system of claim 1, wherein the probability processing module is configured to process the sensor data to calculate a sensor confidence value via probability density calculation.

7. A method for processing sensor data in a vehicle, comprising:
    receiving sensor data from one or more sensors, wherein the sensor data relating to at least one of a vehicle operating characteristic and/or a driving environment;
    displaying a scene, via a vehicle display, comprising one or more images associated with the sensor data;
    processing the sensor data, via a processing apparatus comprising a probability processing module, to calculate a sensor confidence value representing an estimated accuracy for at least one of the one or more sensors; and
    processing the sensor confidence value and modifying the scene on the display by generating a volumetric fog comprising a density that is dependent upon the sensor confidence value via a graphics processing module, based on the processed sensor confidence value, to represent the estimated accuracy for the at least one or more of the sensors.

8. The method of claim 7, further comprising performing, via the processing apparatus, fusion on the sensor data prior to calculating the sensor confidence value.

9. The method of claim 7, further comprising applying one or more weights to the sensor data via the processing apparatus to calculate the sensor confidence value, wherein the one or more weights are determined by a type of sensor providing the sensor data.

10. The method of claim 7, further comprising:
    receiving, in the processing apparatus, further data from the one or more sensors;
    processing, via the processing module, the further sensor data to calculate a new sensor confidence value representing a new estimated accuracy for at least one of the one or more sensors; and
    modifying, via the graphics processing module, the density of the volumetric fog based on the new sensor confidence value.

11. The method of claim 7, wherein modifying the scene on the display comprises modifying at least one of a hue, a saturation, a lightness and/or a temperature of the scene based on the sensor confidence value.

12. The method of claim 7, wherein processing the sensor data to calculate a sensor confidence value comprises a probability density calculation.

13. A method for processing sensor data in a vehicle, comprising:
    receiving sensor data from one or more sensors, wherein the sensor data relating to at least one of a vehicle operating characteristic and/or a driving environment;
    displaying a scene, via a vehicle display, comprising one or more images associated with the sensor data
    processing the sensor data, via a processing apparatus comprising a probability processing module, to calculate a sensor confidence value representing an estimated accuracy for at least one of the one or more sensors;
    processing the sensor confidence value and modifying the scene on the display via a graphics processing module by generating a volumetric fog comprising a density that is based on the processed sensor confidence value, to represent the estimated accuracy for the at least one or more of the sensors;
    receiving, in the processing apparatus, further data from the one or more sensors;
    processing, via the processing module, the further sensor data to calculate a new sensor confidence value representing a new estimated accuracy for at least one of the one or more sensors; and
    further modifying, via the graphics processing module, the scene on the display based on the new sensor confidence value.

14. The method of claim 13, further comprising performing, via the processing apparatus, fusion on the sensor data prior to calculating the sensor confidence value.

15. The method of claim 13, further comprising applying one or more weights to the sensor data via the processing apparatus to calculate the sensor confidence value, wherein the one or more weights are determined by a type of sensor providing the sensor data.

16. The method of claim 13, wherein modifying the scene on the display comprises modifying at least one of a hue, a saturation, a lightness and/or a temperature of the scene based on the sensor confidence value.

17. The method of claim 13, wherein processing the sensor data to calculate a sensor confidence value comprises a probability density calculation.

* * * * *